US011682308B2

(12) United States Patent
Snyder et al.

(10) Patent No.: US 11,682,308 B2
(45) Date of Patent: Jun. 20, 2023

(54) SYSTEM AND METHOD FOR ENHANCING OPERATOR SITUATIONAL AWARENESS OF TRAFFIC DIVERSION PATTERNS AND ADAPTING THERETO

(71) Applicant: Honeywell International Inc., Charlotte, NC (US)

(72) Inventors: Richard Snyder, Phoenix, AZ (US); Rajeev Mohan, Karnataka (IN); Rajesh Chaubey, Bangalore (IN); Ravish Udupa, Bangalore (IN); Sharanabasappa Advani, Bengaluru (IN)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 17/811,938

(22) Filed: Jul. 12, 2022

(65) Prior Publication Data

US 2022/0366797 A1 Nov. 17, 2022

Related U.S. Application Data

(63) Continuation of application No. 16/945,409, filed on Jul. 31, 2020, now Pat. No. 11,417,222, which is a (Continued)

(51) Int. Cl.
*G08G 5/00* (2006.01)
*G08G 5/02* (2006.01)
*G06F 17/00* (2019.01)

(52) U.S. Cl.
CPC .......... *G08G 5/0039* (2013.01); *G08G 5/006* (2013.01); *G08G 5/0013* (2013.01); (Continued)

(58) Field of Classification Search
CPC .......... G08G 5/00; G08G 5/025; G08G 5/082; G06F 17/00
See application file for complete search history.

(56) References Cited

U.S. PATENT DOCUMENTS 6,163,744 A 12/2000 Onken et al.
7,436,323 B2 10/2008 Ishihara et al.
(Continued)

FOREIGN PATENT DOCUMENTS

| | | | |
|---|---|---|---|
| EP | 2 975 597 | A1 | 1/2016 |
| EP | 2 595 136 | A2 | 5/2018 |
| WO | 2008130948 | A1 | 10/2008 |

OTHER PUBLICATIONS

European Search Report cited in related EP 19150130.3, dated Jun. 5, 2019 (8 pages).

*Primary Examiner* — Tan Q Nguyen
(74) *Attorney, Agent, or Firm* — Bookoff McAndrews PLLC

(57) ABSTRACT

A system and methods for enhancing operator situational awareness are disclosed. For example, one method includes monitoring a plurality of radio transmissions associated with a plurality of vehicles in a first traffic flow pattern, monitoring a second traffic flow pattern in a vicinity of a vehicle of the plurality of vehicles, monitoring at least one weather value for a destination site for the plurality of vehicles, proposing a destination approach for the vehicle in response to the monitoring, evaluating an impact of the proposed destination approach on an existing travel path for the vehicle, and generating a second travel path for the vehicle in response to the evaluating.

20 Claims, 9 Drawing Sheets

Related U.S. Application Data continuation of application No. 15/867,666, filed on Jan. 10, 2018, now Pat. No. 10,854,093.

(52) U.S. Cl.
CPC ......... *G08G 5/0021* (2013.01); *G08G 5/0026* (2013.01); *G08G 5/0078* (2013.01); *G08G 5/0082* (2013.01); *G08G 5/0091* (2013.01); *G08G 5/025* (2013.01)

(56) References Cited

U.S. PATENT DOCUMENTS

| | | | | |
|---|---|---|---|---|
| 7,546,206 | B1 * | 6/2009 | Miller | G08G 5/0039 701/120 |
| 7,693,621 | B1 | 4/2010 | Chamas | |
| 7,742,847 | B2 | 6/2010 | DeMers et al. | |
| 8,014,907 | B2 | 9/2011 | Coulmeau | |
| 8,112,187 | B2 | 2/2012 | Coulmeau | |
| 8,126,599 | B2 | 2/2012 | Coulmeau et al. | |
| 8,195,347 | B2 | 6/2012 | Boorman | |
| 8,321,069 | B2 | 11/2012 | Vasek et al. | |
| 8,560,150 | B1 | 10/2013 | Phillips et al. | |
| 8,660,716 | B1 | 2/2014 | Rahmes et al. | |
| 2005/0187677 | A1 | 8/2005 | Walker | |
| 2007/0219679 | A1 | 9/2007 | Coulmeau | |
| 2009/0043434 | A1 | 2/2009 | Deker | |
| 2013/0024060 | A1 * | 1/2013 | Sukkarie | H04L 67/12 701/22 |
| 2014/0343765 | A1 | 11/2014 | Suiter et al. | |
| 2015/0243173 | A1 | 8/2015 | Esposito et al. | |
| 2015/0279218 | A1 | 10/2015 | Irrgang et al. | |
| 2016/0275801 | A1 * | 9/2016 | Kopardekar | G08G 5/0013 |
| 2017/0030734 | A1 | 2/2017 | Shalaat et al. | |
| 2017/0200376 | A1 | 7/2017 | Itabashi et al. | |
| 2021/0256858 | A1 * | 8/2021 | Gupta | G08G 5/0043 |

* cited by examiner

SYSTEM AND METHOD FOR ENHANCING OPERATOR SITUATIONAL AWARENESS OF TRAFFIC DIVERSION PATTERNS AND ADAPTING THERETO

CROSS-REFERENCE TO RELATED APPLICATION(S)

This patent application is a continuation of U.S. Non-provisional patent application Ser. No. 16/945,409, filed on Jul. 31, 2020, which is a continuation of and claims the benefit of priority to U.S. Non-provisional patent application Ser. No. 15/867,666, filed on Jan. 10, 2018, which is U.S. Pat. No. 10,854,093 issued Dec. 1, 2020, the entireties of which are incorporated herein by reference.

BACKGROUND

In flight safety terms, the phrase “situational awareness” generally means that the pilot (e.g., senior flight crew member, operator) in command of an aircraft is required to take into account all that is going on within the aircraft and its immediate vicinity during all phases of the flight. In order to meet this requirement during the more critical phases (e.g., approach and landing) of the flight, pilots and flight crews are tasked to perform numerous briefing procedures including, for example, reviewing the approach, landing and taxi charts for the destination airfield, working through the final approach checklist and verifying each item on the list, periodically reprogramming the aircraft’s flight management system (FMS) with runway, approach, standard arrival route (STAR) and transition information updates, and feeding in wind and/or temperature information to the FMS in order to update the aircraft’s flight plan. However, during such critical phases of the flight, these tasks require the pilots to experience prolonged periods of head-down activity, while also requiring them to respond to air traffic control (ATC) instructions and air traffic movement within the vicinity of the aircraft. Consequently, a number of flight safety problems can arise. For example, these prolonged periods of head-down activity can significantly distract the pilots and/or crew members and ultimately cause them to make serious errors, such as, for example, incorrectly programming the FMS and causing discontinuities in the flight plan, and reducing their awareness of the aircraft’s energy situation, which in turn, can cause them to make unstable landings, avoidable go-arounds, and hard landings that can damage the aircraft involved.

Certain air traffic services broadcast information designed to enhance the situational awareness of pilots and crew members during flights. For example, the traffic information service-broadcast (TIS-B) transmits “traffic advisory” or “proximate intruder” information for collision avoidance purposes, which enables pilots to visualize (substantially in real time) the positions and ground tracks of other aircraft nearby. Another air traffic service is the flight information service (FIS), which is available to each aircraft within a given flight information region (FIR). The FIS transmits such information as air traffic, potentially conflicting air traffic, meteorological information, state of the runway within the FIR, and other information useful to pilots for safe and efficient handling of flights.

Notwithstanding the utility of these air traffic services, certain flight operational problems still exist. For example, pilot flight performance is typically evaluated in terms of fuel savings and least numbers of go-arounds. Consequently, in order to maximize fuel savings and minimize the number of go-arounds, pilots sometimes attempt to land while the aircraft is in a less stable condition that can result in a harder than normal landing and damage to the aircraft involved. Furthermore, even if pilots closely monitor and follow the air traffic services information provided (e.g., by the TIS-B, FIS, etc.), pilots are often unaware of an aircraft diverting from the established traffic pattern until the aircraft changes course, or they overhear the air traffic controller directing an aircraft to change its heading and divert from the pattern.

FIG. 1 is a diagram 100 illustrating how a lack of advanced knowledge of an aircraft’s diversion from a traffic pattern can adversely affect the stability and safety of the aircraft especially during the landing phase of the flight. Notably, a baseline preference is that each aircraft takes off and lands into the wind (e.g., opposite the prevailing direction of the wind) to maximize lift. As such, referring to the exemplary diagram 100 depicted in FIG. 1, the wind direction is depicted at time “t”, and the approach briefing for all incoming air traffic is performed based on the wind information available at time “t”. For example, at time t1, the crew of the “ownship” aircraft 102 has performed the approach briefing prior to beginning the descent to runway one (RW1), which has been confirmed for landing based on the favorable direction of the prevailing wind 104. Next, at time t2, the ownship aircraft 102 is now depicted as following the course of the nearby aircraft 106 and the aircraft 102 is still confirmed to land at RW1. However, at time t+20 minutes, the wind direction 108 has now changed and is suitable for aircraft landings on runway two (RW2). However, at time t3, the aircraft 110 on approach receives directions from the destination airfield’s ATC to land at RW2 because the direction of the prevailing wind has changed. Consequently, the aircraft 110, which was on approach to RW1, now diverts away from the established traffic pattern and proceeds to land at RW2. However, the ownship aircraft 102 is still on its original course and prepared to land at RW1 based on the approach briefing performed at time t1. Thus, the problem for the crew of the aircraft 102 is that without having prior knowledge that the aircraft 110 will change its course, the crew of the aircraft 102 is not prepared to change its course and maintain an optimal flight profile if directed to land at RW2. Consequently, this delay in crew preparation and the resulting uncertainty about the distance to touchdown can result in the aircraft 102 flying too high and fast during the final approach and damaging the aircraft as a result.

Notably, the above-described problems also exist within the transportation field for vehicles other than aircraft. For example, these problems also exist for other modes of transport, such as trains, ships and trucks, where an unexpected diversion from an established traffic pattern has a deleterious effect on the safety and efficiency of movement of the vehicles involved.

For the reasons stated above, and for other reasons stated below, which will become apparent to those skilled in the art upon reading and understanding the specification, there is a need in the art for techniques that will enhance operator’s situational awareness so that traffic pattern diversions can be determined, evaluated and adapted to in advance.

SUMMARY

The embodiments of the present invention provide ways to enhance crew members’ situational awareness so that diversions from the traffic pattern can be determined or predicted, evaluated and adapted to in advance, and will be understood by reading and studying the following specification.

A system and method for enhanced operator situational awareness are provided. In one embodiment, a system to enhance flight crew situational awareness is provided that continuously monitors air traffic to detect changes in the traffic flow pattern, and adapts an aircraft's automated flight systems (e.g., FMS, avionics and the like) to the evolving situation. For example, the system detects potential landing parameter changes, evaluates the impact of the potential changes on an aircraft's established flight plan, adapts the aircraft's automated flight system to prepare to change the flight plan, and updates the aircraft's automated flight system to change the flight plan if required. In a second embodiment, the system for enhanced situational awareness continuously monitors traffic for vehicles other than aircraft, such as, for example, trains, ships and trucks, and adapts the vehicles' traffic management systems to the evolving situations.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the exemplary embodiments. Reference characters denote like elements throughout the figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention improve on the prior art by enabling flight crews to be made aware of potential changes in traffic flow patterns and adapting to them in advance in order to avoid flight profile changes late in their aircraft's descent. For example, a system to enhance flight crew situational awareness is provided that continuously monitors air traffic to detect changes in the traffic flow pattern, and adapts an aircraft's automated flight systems (e.g., FMS, avionics and the like) to the evolving situation. In one embodiment, the system detects potential landing parameter changes, evaluates the impact of the potential changes on an aircraft's established flight plan, adapts the aircraft's automated flight systems to prepare to change to the new flight plan, and updates the aircraft's FMS or Electronic Flight Bag (EFB) to change the flight plan if required.

Figure 1:
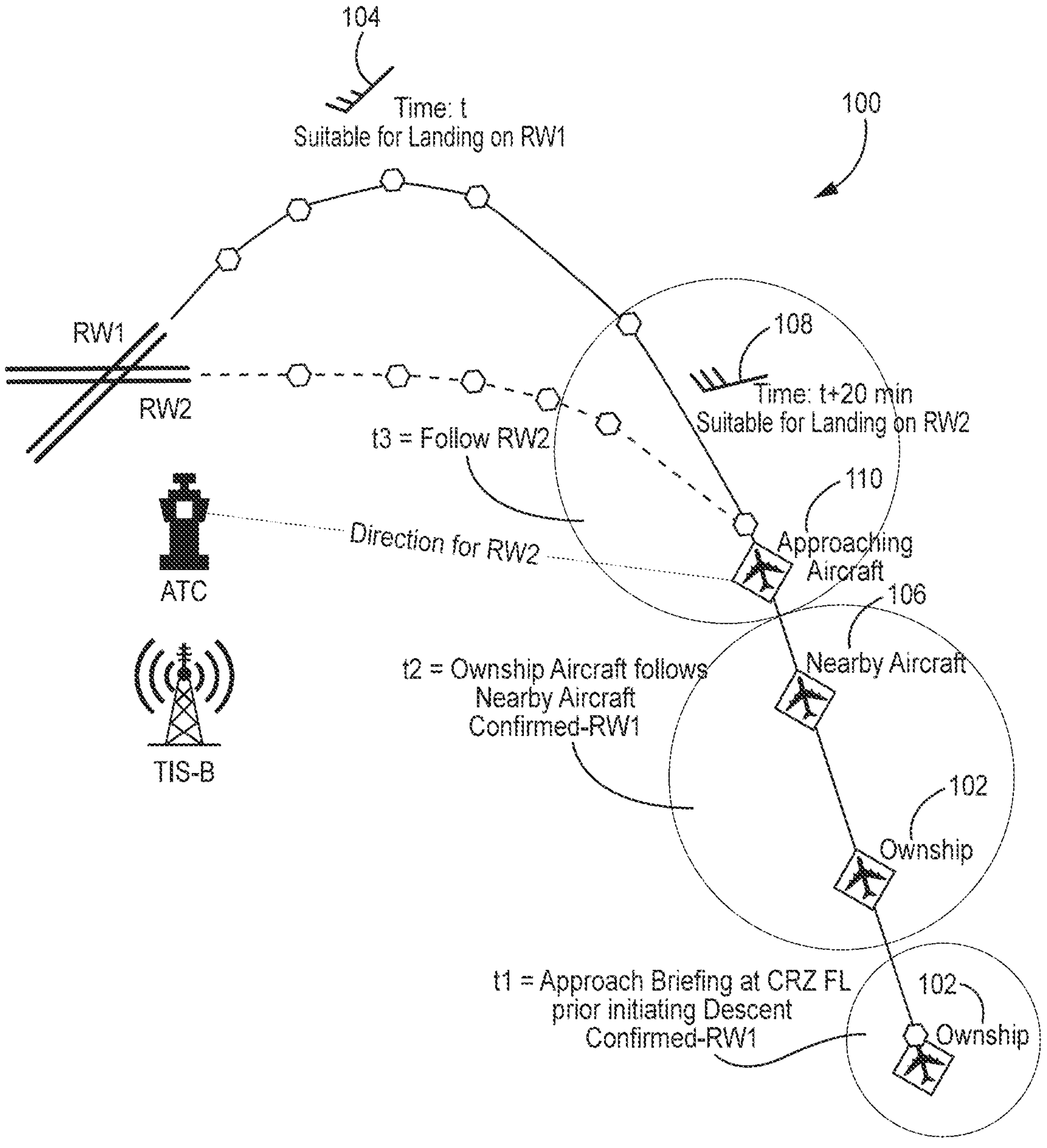
FIG. 1 is a diagram illustrating how a lack of advanced knowledge of an aircraft's diversion from a traffic pattern can adversely affect the stability and safety of that and other aircraft.
Figure 2:
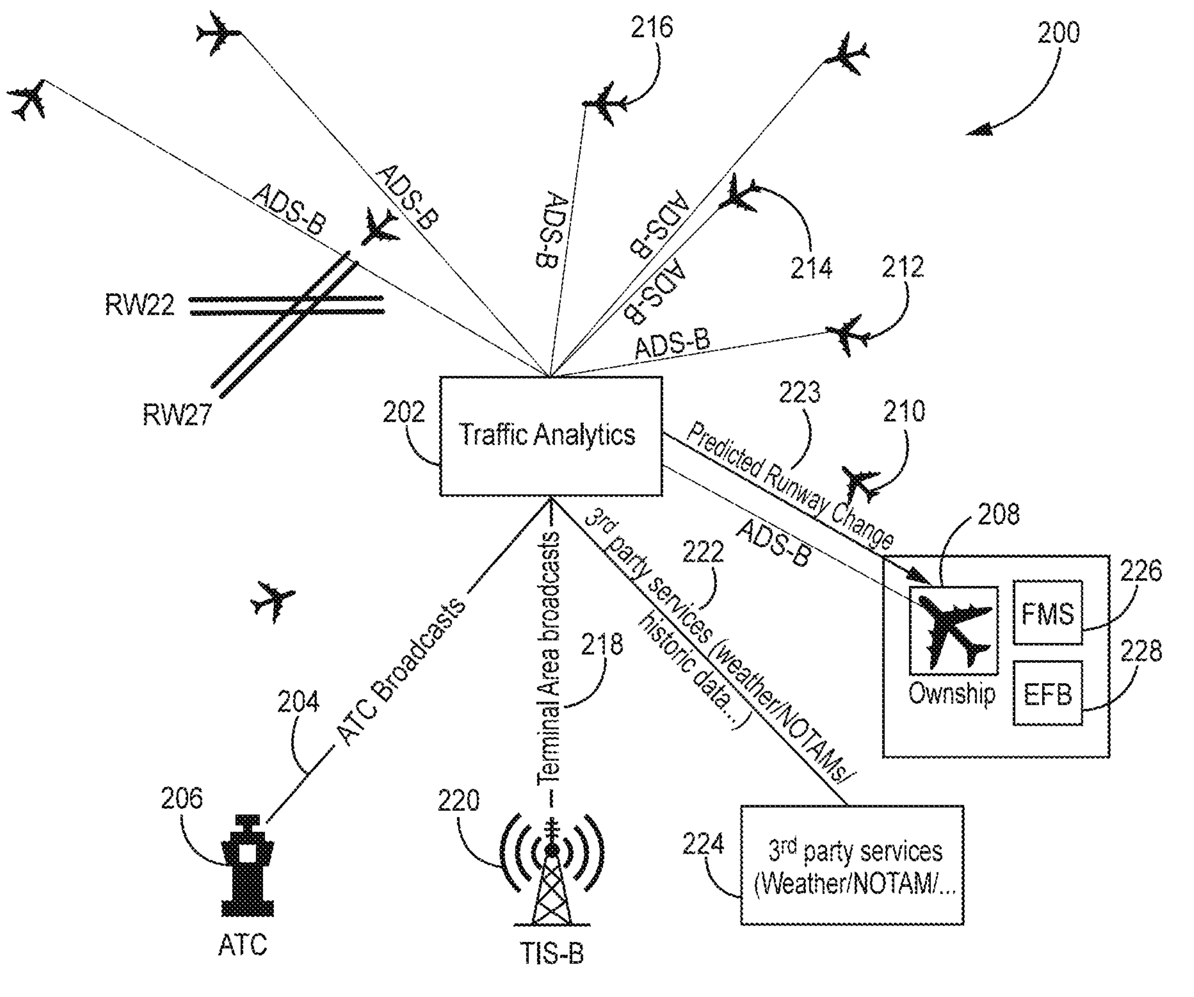
FIG. 2 is a diagram illustrating a system that can be utilized to implement one example embodiment of the present invention.

FIG. 2 is a diagram illustrating a system 200, which can be utilized to implement one example embodiment of the present invention. Referring to FIG. 2, a traffic analytics system 202 is shown. In one embodiment, the traffic analysis system 202 is configured to detect landing parameter changes that can occur in the system 200. For example, the traffic analytics system 202 is configured to continuously monitor all broadcasts 204 from the regional/local ATC 206. These monitored broadcasts include destination information for all aircraft in the traffic pattern and ahead of the ownship 208 (e.g., 210, 212, 214, 216). The traffic analytics system 202 also continuously monitors the terminal area broadcasts 218 transmitted by the local/regional TIS-B 220, which broadcasts include "traffic advisory" or "proximate intruder" information that can be utilized by aircraft for collision avoidance purposes. Furthermore, the traffic analytics system 202 continuously monitors third part services transmissions 222 including meteorological information (e.g., wind direction and magnitude at the destination runway), notice to airmen (NOTAM) transmissions indicating potential flight hazards further along the flight path, and other flight safety information provided by third party services 224. The traffic analytics system 202 analyses the monitored information and utilizes the results to predict potential changes that may occur with respect to the landing runway (e.g., RW22 or RW27) and associated arrival procedures to be followed.

Next, the traffic analytics system 202 evaluates the impact of the predicted changes on the own ship's 208 existing, programmed flight plan, and generates information that can be utilized to adapt the aircraft's automated navigation systems FMS 226 and EFB 228 to the predicted changes. For example, the traffic analytics system 202 can create a new flight plan based on the predicted change to the destination runway, create a direct-to waypoint that the ownship 202 can utilize to redirect its flight path, delete any discontinuities in the flight plan that can be caused by the redirection, insert updated wind and magnitude information into the proposed flight plan, generate a new trajectory for the proposed flight plan, provide the crew with a visual depiction of the proposed flight plan (e.g., laterally and vertically), and load the proposed flight plan into the FMS 226 of the ownship 208 if the ATC 206 instructs the ownship 208 to make the predicted change to the flight plan. If the ATC 206 broadcasts such an instruction 204, the data for the new flight plan are coupled to the FMS 226 and EFB 228 in the ownship 208 via a suitable datalink 223, and the current flight plan is updated with the changes.

Notably, in a second example embodiment, a system substantially similar in function to the traffic analytics system 202 can be utilized to evaluate the impact of predicted changes on a vehicle's (e.g., train, truck, ship) existing (e.g., programmed) transit plan, and generate suitable information that can be utilized to adapt the vehicle's automated transit system to the predicted changes.

Figure 3:
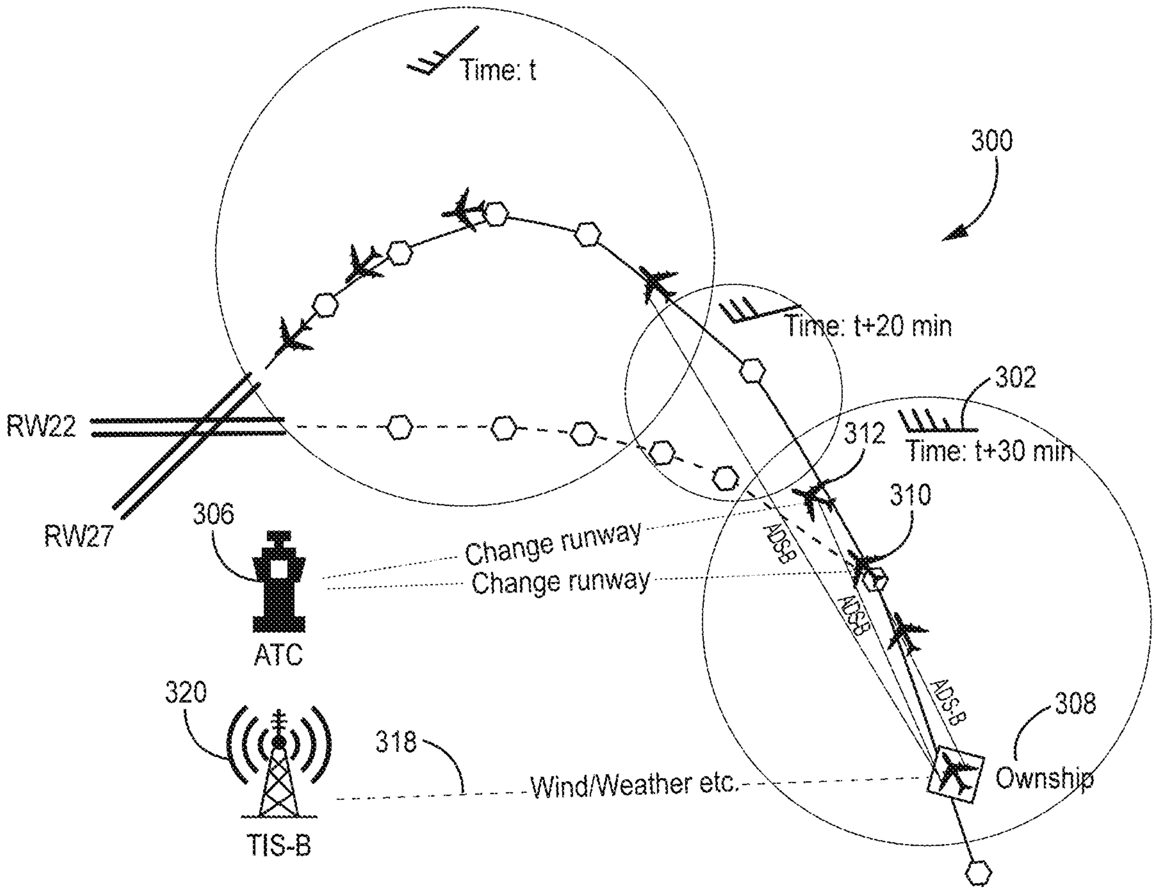
FIG. 3 is a diagram illustrating the positive impact of continuously monitoring the traffic flow pattern when the traffic flow pattern is changed due to wind direction changes.

FIG. 3 is a diagram 300 illustrating the positive impact of continuously monitoring the traffic flow pattern when it changes due to wind direction changes. Referring to FIG. 3, at t+30 minutes prior to landing, the prevailing wind 302 is favorable for landing on runway 22. Notably, at this time, the ownship 308 is continuously monitoring wind and weather information being broadcast from the TIS-B 320, landing directions for aircraft being transmitted by the ATC 306, and Automatic Dependent Surveillance-Broadcast (ADS-B) transmissions of position information from aircraft in the traffic pattern ahead of the ownship 308. For example, at time "t", the ownship 308 determines that the prevailing wind direction is favorable for landing at runway 27. However, at time "t+20 minutes", the ownship 308 determines from the monitored weather broadcasts that the prevailing wind direction has changed, and is now favorable for landing at runway 22. As such, the flight crew of the ownship 308 can prepare for a probable landing at runway 22. At time "t+30 minutes", the ATC 306 transmits directions for the aircraft 310, 312, which are ahead of the ownship 308 in the traffic pattern, to divert and change their course directions and land at runway 22. Thus, by continuously monitoring the traffic flow pattern, the flight crew of the ownship 308 will have time to prepare their feasibility assessment for landing at runway 22 and be prepared to change course in order to land at runway 22 if directed to do so by the ATC 306. Consequently, since the flight crew of the ownship 308 is aware of the traffic pattern change in advance, the flight crew can be certain about the distance to touchdown and will not be flying their aircraft too high and fast during its approach to runway 22.

Notably, in a second example embodiment, a system is provided (e.g., substantially similar in function to the traffic analytics system 202 in FIG. 2) that can be utilized to continuously monitor the traffic flow pattern for the vehicles (e.g., trains, ships, trucks and the like) involved, and prepare each vehicle operator for a potential change in course if directed to do so by the operational center involved. For example, such a system can be utilized by a dispatch center for a trucking company or a railroad, or an operational center for a seaport.

Figure 4:
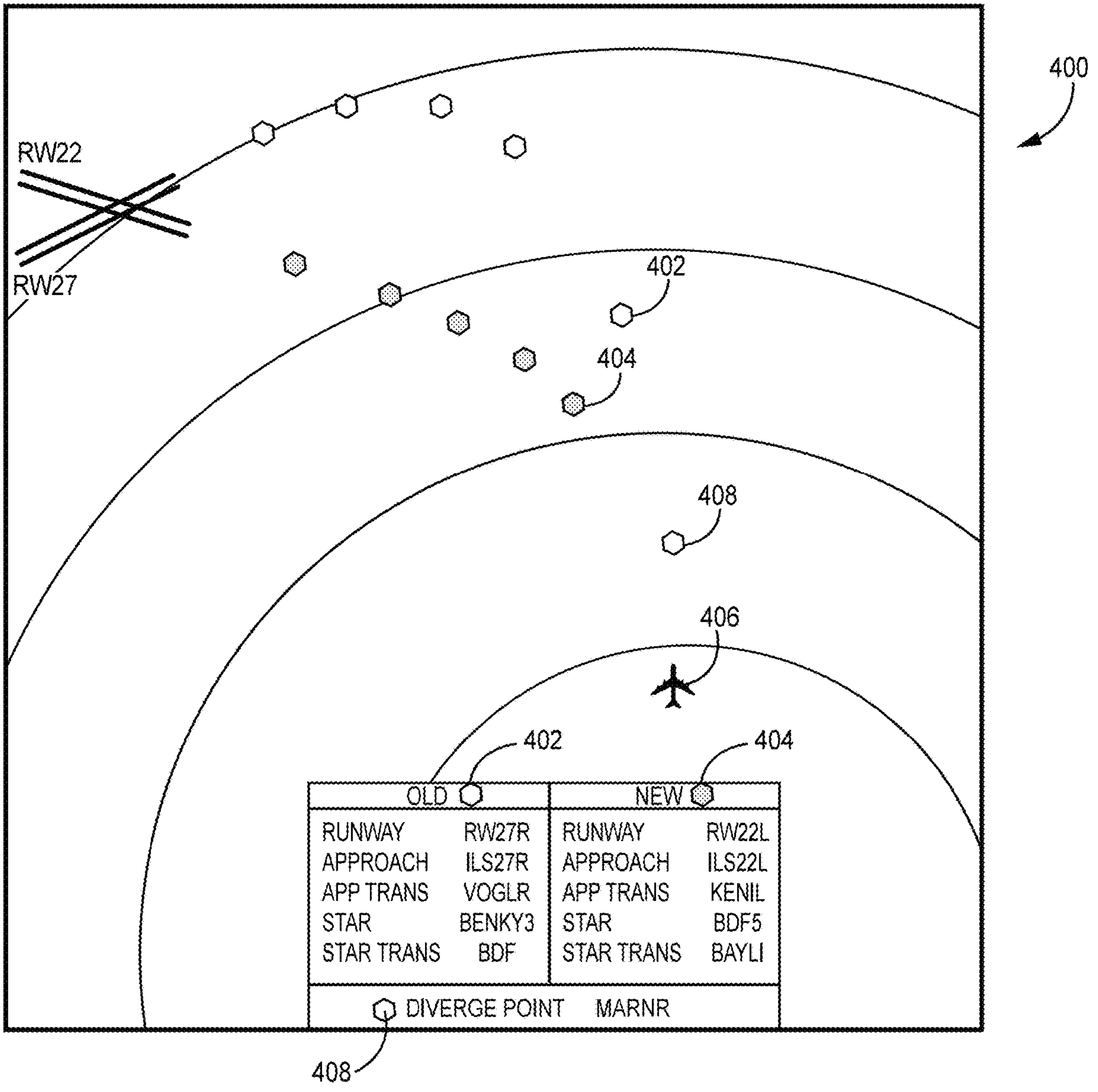
FIG. 4 illustrates a visual display that can be utilized to implement one example embodiment of the present invention.

FIG. 4 illustrates a visual display 400, which can be utilized to implement one example embodiment of the present invention. For example, the visual display 400 can be a heads-down or heads-up display generated on an aircraft's FMS page or display, or the display on an EFB or other suitable avionics system onboard the aircraft involved. Notably, the visual display 400 provides a visual indication to the flight crew of the aircraft 406 regarding a predicted course change 404 to runway 22, a predicted diverge waypoint 408, and a comparison with the existing flight plan (e.g., 402). Notably, as described above with respect to FIG. 3, the visual display 400 enables the flight crew to be prepared for a change in course before the ATC transmits confirmation of the clearance request, which significantly lessens the amount of head-down time imposed on the pilot as the aircraft approaches the runway.

Figure 5:
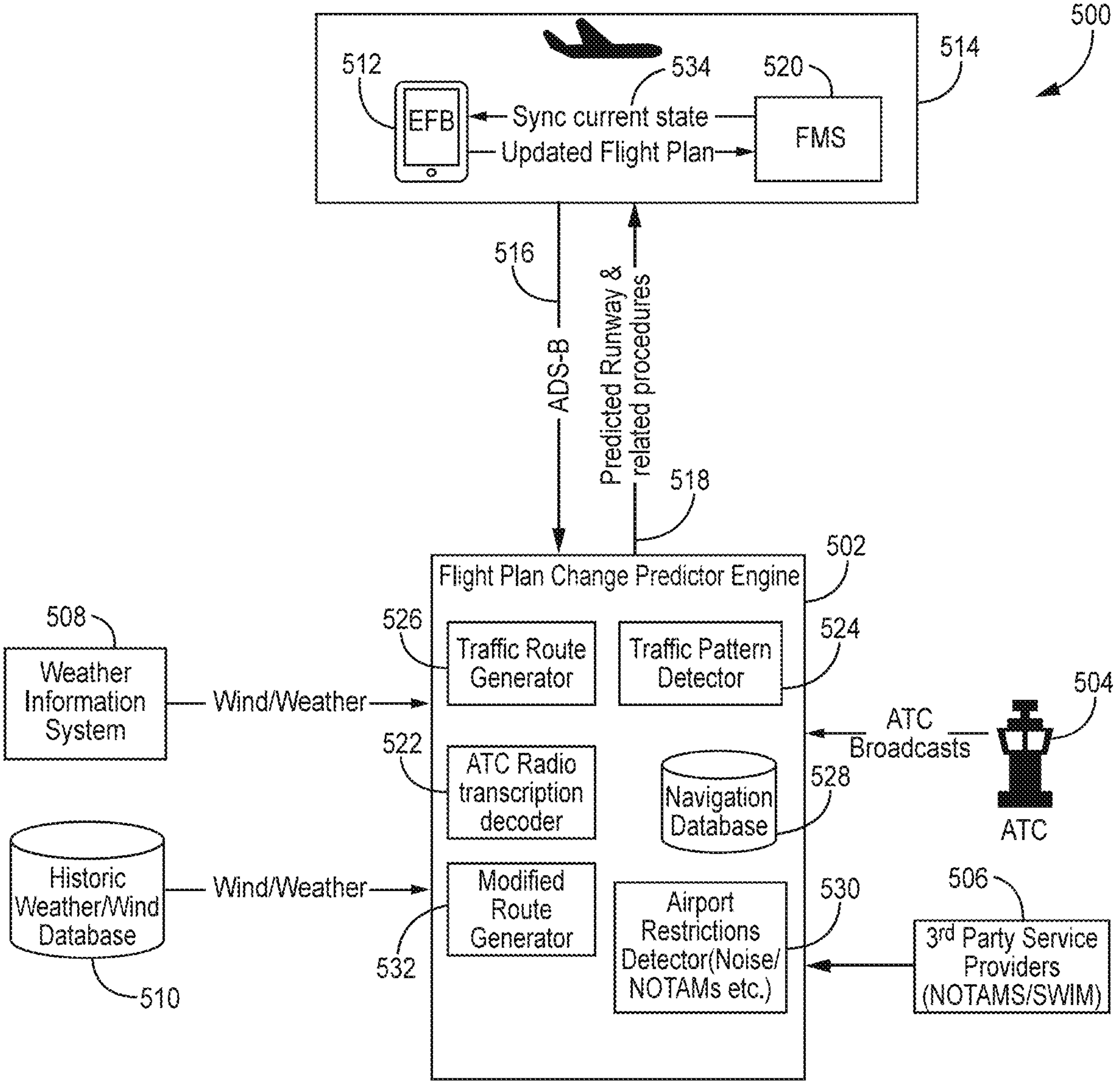
FIG. 5 is a diagram illustrating a system that can be utilized to implement one example embodiment of the present invention.

FIG. 5 is a diagram illustrating a system 500, which can be utilized to implement one example embodiment of the present invention. For example, the system 500 can be utilized to implement the exemplary system 200 depicted in FIG. 2. Referring to FIG. 5, the system 500 includes a flight plan change predictor engine (e.g., "predictor engine" hereinafter) 502. In one embodiment, the predictor engine 502 can be utilized to implement the traffic analytics system 202 depicted in FIG. 2. In the embodiment depicted in FIG. 5, the predictor engine 502 is configured to interface with air traffic service information providers such as, for example, an ATC 504, one or more third party service providers 506, a weather information system 508, and a database 510 including historical weather and wind data. In one embodiment, the predictor engine 502 can be implemented as a subsystem of a ground-based server infrastructure. In a second embodiment, the predictor engine 502 can be implemented as an integral component of an EFB 512 onboard an aircraft 514.

In one embodiment, the predictor engine 502 utilizes the information received from the external entities 504, 506, 508, 510 and the ADS-B transmissions 516 from the aircraft 514 to determine in advance any potential changes to runway landing assignments and their associated arrival procedures. For example, the predictor engine 502 can be utilized by a flight crew to determine impending changes to the current flight plan, and provide this information in a suitable processing form that enhances the flight crew's ability to more quickly adapt to an impending change well before it occurs. As such, in one embodiment, the predictor engine 502 can provide such information to the EFB 512 via a wired or wireless communication link 518 as, for example, the changed destination runway, the approach transition information, STAR and STAR transition information for the proposed runway, the last waypoint in the current flight plan where the diversion is to occur, and the direct-to waypoint to enable the removal of discontinuities that may exist between the current and proposed flight plan. The EFB 512 outputs the updated flight plan to the FMS 520 onboard the aircraft 514.

In the embodiment depicted in FIG. 5, the predictor engine 502 includes an ATC radio transcription decoder 522, which is a receiver that monitors the broadcast frequencies of the ATC 504 to determine if the ATC plans any runway changes for aircraft in the traffic pattern. The ATC radio transcription decoder 522 obtains details of proposed runway and arrival procedure changes for aircraft nearer to the destination runway and ahead of the ownship aircraft 514. The predictor engine 502 also includes a traffic pattern detector 524, which keeps track of the flight route pattern of each aircraft in the vicinity of the ownship aircraft 514 and thereby determines changes in the traffic flow pattern. The traffic pattern detector 524 utilizes the ADS-B transmissions from the air traffic around the destination airport, as well as air traffic information obtained from the FAA's System-Wide Information Management (SWIM) network, if available. In one embodiment, the traffic pattern detector 524 can utilize suitable computer machine learning programs to group the traffic flowing into the destination airport's runways.

The traffic route generator 526 is utilized to create the historical and tactical flight plan route changes for aircraft near the destination airport. The navigation database 528 maintains the current navigation data for the ownship aircraft 514 including waypoints, runways, and arrival procedures and the like. The airport restrictions detector 530 determines what restrictions are imposed on the destination airport/runways (e.g., in the form of NOTAMS, noise abatement rules, etc.). The modified route generator 532 retrieves and provides the changed flight plan elements from the navigation database 528, such as, for example, changed runway, waypoint in the current flight plan of the aircraft 514 from which a diversion to a different runway is to be made, and the direct-to waypoint in the modified arrival procedure that enables the closing out of discontinuities in the new flight plan.

The EFB 512 is an onboard application that syncs data regarding the current flight plan from the onboard FMS 520. Alternatively, the pilot can manually enter the current flight plan data into the EFB 512. The EFB 512 utilizes information received from the flight plan predictor engine 502 to create a modified flight plan based on detected changes to the destination runway. In one embodiment, the EFB 512 determines the last waypoint in the current flight plan of the aircraft 514 from which a diversion to a new runway is to be made, and the direct-to waypoint in the modified arrival procedure to enable the closing of discontinuities in the new flight plan. In one embodiment, the EFB 512 provides a visual display of the proposed changes to the current flight plan and the impact of the changes on the current flight plan. For example, in one embodiment, the EFB 512 utilizes a Strategic Planning Engine (SPE) software component to create lateral and vertical trajectories for the aircraft 514 based on the current state of the aircraft and updates to the current flight plan. As such, when the ATC 504 confirms the change in destination request made by the aircraft 514, the EFB 512 can sync the modified flight plan with the onboard FMS 520 to control the aircraft, or the pilot can manually control the aircraft to land at the new runway. The EFB 512 also ensures that the aircraft 514 adheres to all lateral/vertical spacing requirements with respect to the other aircraft ahead or in the vicinity of the aircraft 514. The onboard FMS 520 is configured to provide the current flight plan as well as the current state parameter information for the aircraft 514. Also, the FMS 520 can accept updated flight plan data from sources external to the aircraft such as, for example, an EFB situated at a ground station infrastructure.

Figure 6:
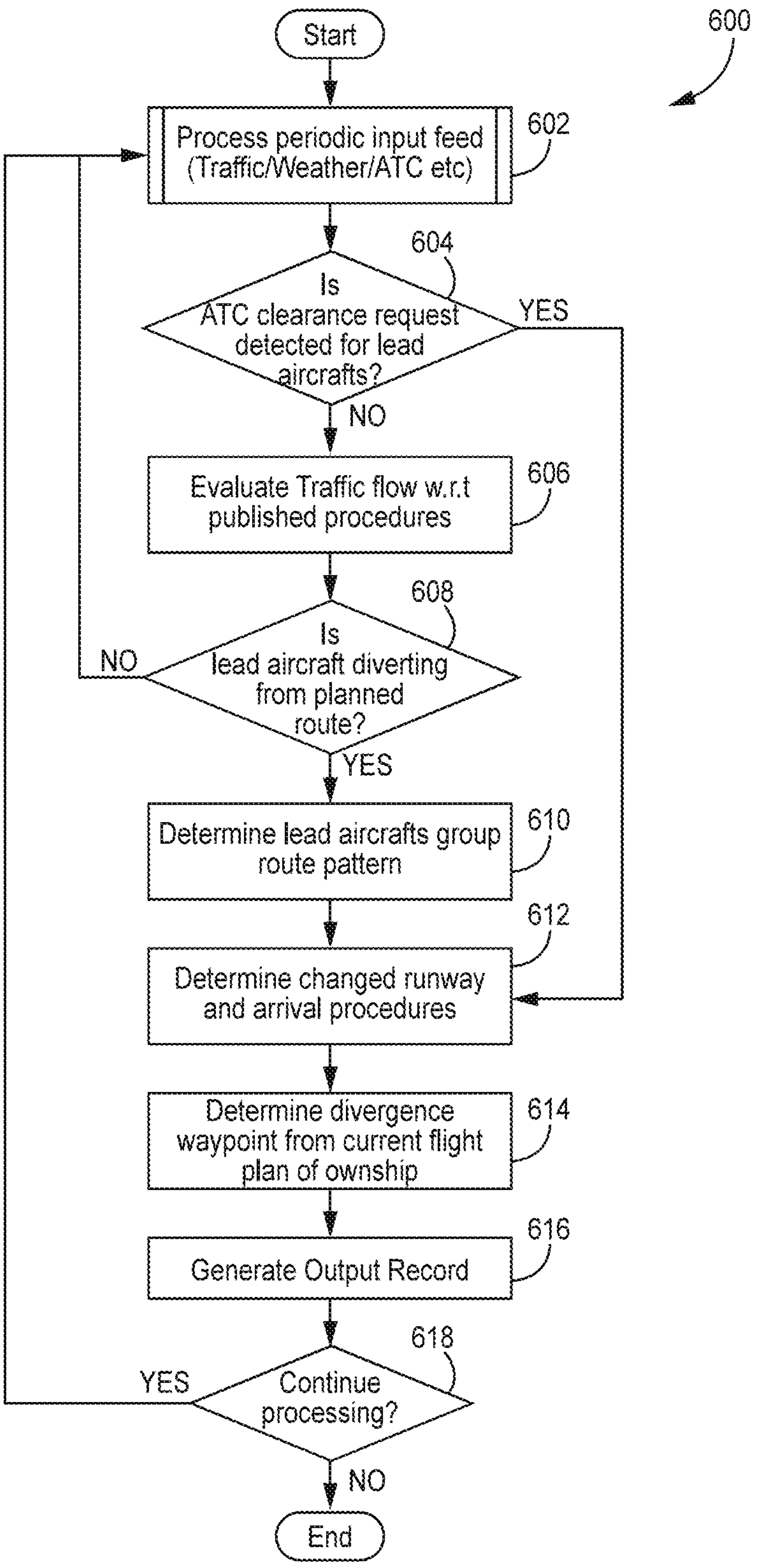
FIG. 6 illustrates a method that can be utilized to implement one example embodiment of the present invention.

FIG. 6 illustrates a method 600, which can be utilized to implement one example embodiment of the present invention. For example, the method 600 can be utilized to implement exemplary functions of the components of the Fight Plan Change Predictor Engine ("predictor engine") 502 illustrated in FIG. 5. As such, referring to FIGS. 5 and 6, the method 600 begins by inputting and processing information periodically received from sources external to the predictor engine 502 such as, for example, wind and weather information from the weather information system 508, broadcasts from the ATC 504, and traffic pattern information from the traffic pattern detector 524 (602). Next, the method determines if an ATC clearance request (e.g., runway change request) has been made by the ATC 504 for any aircraft ahead of the ownship in the traffic pattern (604). If not, the predictor engine 502 continuously evaluates the current traffic pattern utilizing, for example, the traffic pattern detector 524 (606). As such, the predictor engine 502 determines if any aircraft ahead of the ownship 514 is/are diverting away from the published route (608). If not, then the flow returns to block 602. However, if (at 608) any lead aircraft is/are diverting from the planned route, the predictor engine 502 determines the new route of the diverting aircraft or route pattern of the diverting group utilizing, for example, the traffic route generator 526 (610). The predictor engine 502 then determines the new runway and associated arrival procedures for the diverting aircraft utilizing, for example, the modified route generator 532 (612). Notably, returning to block 604, if the predictor engine 502 determines that an ATC clearance request (e.g., runway change request) has been made by the ATC 504 for one or more aircraft ahead of the ownship 514 in the traffic pattern, then the flow also proceeds to block 612.

Next, predictor engine 502 determines the divergence waypoint from the current flight plan of the ownship 514 utilizing, for example, the modified route generator 532. The predictor engine 502 then generates an output record including the new runway and associated arrival procedures to be forwarded to the EFB 512 (616). The predictor engine 502 then determines if the flight change processing should continue (608). If so, the flow returns to block 602. Otherwise, the flow is terminated.

Figure 7:
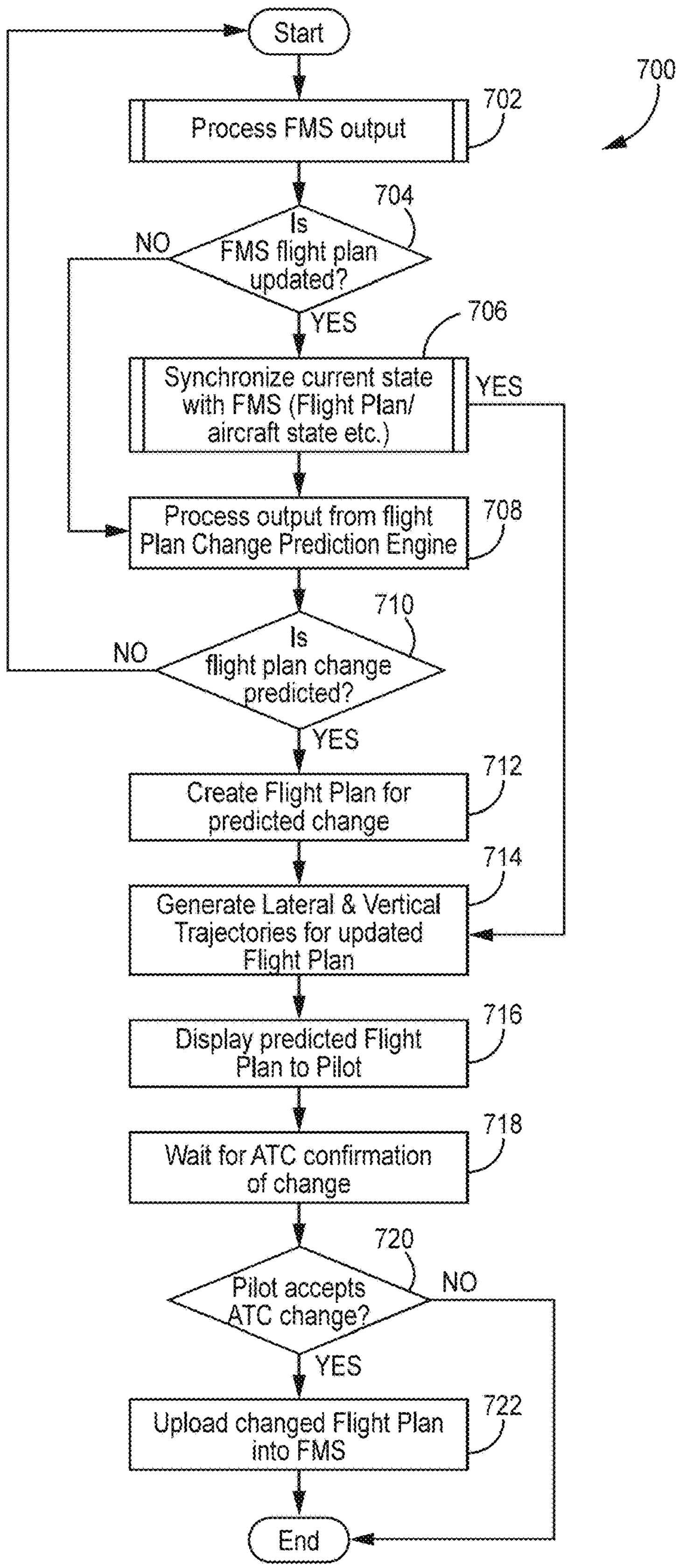
FIG. 7 illustrates a second method that can be utilized to implement one example embodiment of the present invention.

FIG. 7 illustrates a second method 700, which can be utilized to implement one example embodiment of the present invention. For example, the method 700 can be utilized to implement exemplary functions of the EFB 512 and FMS 520 illustrated in FIG. 5. As such referring to FIGS. 5 and 7, the method 700 begins by the EFB 512 processing the information 534 received from the FMS 520 (702). The EFB 512 then determines if the flight plan information from the FMS 520 has been updated (704). If so, the EFB 512 synchronizes the current state information (e.g., current flight plan, state of the aircraft 514, etc.) from the FMS 520 (706). Next, the EFB 512 processes the predicted runway and associated procedural information 518 received from the predictor engine 502 (708). Returning to block 704, if the EFB 512 determines that the current flight plan for the FMS 520 has not been updated, then the flow proceeds directly to block 708. The EFB 512 then determines if the predictor engine 502 has predicted that a change to the current flight plan is to occur (710). If not, then the flow returns to block 702.

However, if (at 710) the EFB 512 determines that a change to the current flight plan is predicted to occur, the EFB 512 generates a new flight plan including the predicted change (712). The EFB 512 also generates suitable lateral and vertical trajectories for the new flight plan (714). Notably, returning to block 704, if the EFB 512 has determined that the FMS' flight plan is updated, then (at 706) the flow also proceeds to block 714, and the EFB 512 generates the lateral and vertical trajectories for the new flight plan. Next, the EFB 512 displays a visual representation of the predicted flight plan to the pilot/flight crew (716). The pilot/flight crew then waits for a transmission from the ATC 504 that confirms the predicted change to the flight plan (718). The pilot/flight crew then determines whether or not to accept the flight plan change issued from the ATC 504 (720). If (at 720) the pilot/flight crew accepts the flight plan change issued by the ATC 504, the EFB 512 uploads the new flight plan into the FMS 520 (722), and the method is terminated. However, if (at 720) the pilot/flight crew does not accept the flight plan change issued from the ATC 504, then the method is terminated. In this case, the pilot/flight crew can follow the current flight plan or return to block 702 to start the method 700 again.

Figure 8:
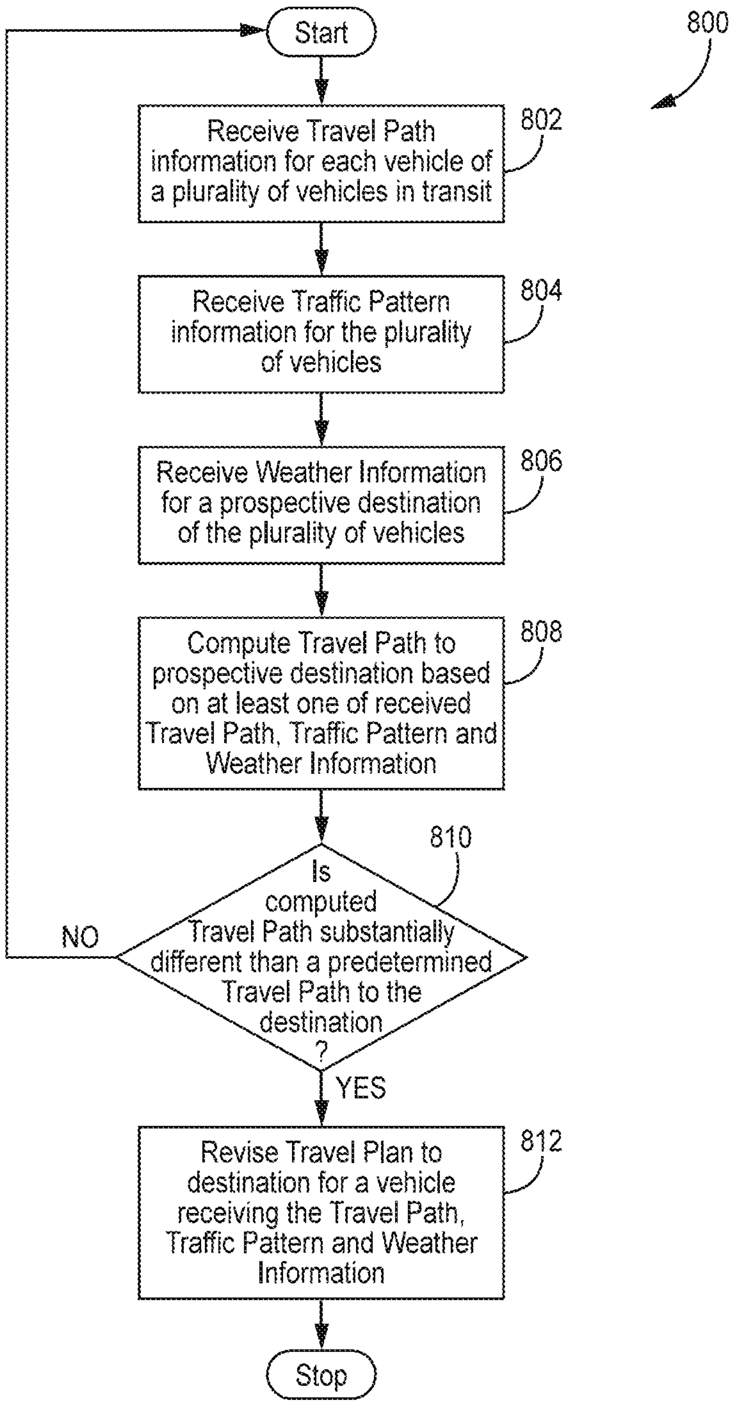
FIG. 8 illustrates a third method that can be utilized to implement one example embodiment of the present invention.

FIG. 8 illustrates a third method 800, which can be utilized to implement one example embodiment of the present invention. For example, the method 800 can be utilized to implement exemplary functions of the components of the traffic analytics system 202 illustrated in FIG. 2 and thus the predictor engine 502 illustrated in FIG. 5. As such, referring to FIGS. 2, 5 and 8 for this example embodiment, the method 800 begins by the traffic analytics system 202 (e.g., traffic pattern detector 522) receiving travel path (e.g., course) information for each vehicle (e.g., aircraft 208, 210, 212, 215, 216, etc.) in transit (802). The traffic analytics system 202 (e.g., traffic pattern detector 522) also receives traffic pattern information for the vehicles (e.g., 208, 210, 212, 215, 216, etc.) in transit (804). Additionally, the traffic analytics system 202 receives weather information (e.g., from third party services 224) for a prospective destination (e.g., airport or runway) of the vehicles in transit (806). Next, the traffic analytics system 202 (e.g., the traffic route generator 526) computes a travel path (e.g., course) to the prospective destination for a vehicle (e.g., ownship 208) based on at least one of the received travel path, travel pattern and weather information (808). The traffic analytics system 202 (e.g., traffic route generator 526) then determines if the computed travel path for that vehicle is substantially different than a predetermined (e.g., existing) travel path to the prospective destination (e.g., stored in the navigation database 528) for that vehicle (810). If so, then the vehicle's management system (e.g., FMS 520) computes and revises the travel (e.g., flight) plan to the prospective destination for the vehicle (e.g., 514) receiving the travel path, traffic pattern and weather information (812), and the method is then terminated. However, if (810) the computed travel path for that vehicle is not substantially different than the predetermined travel path to the prospective destination, the flow returns to the start (802).

Figure 9:
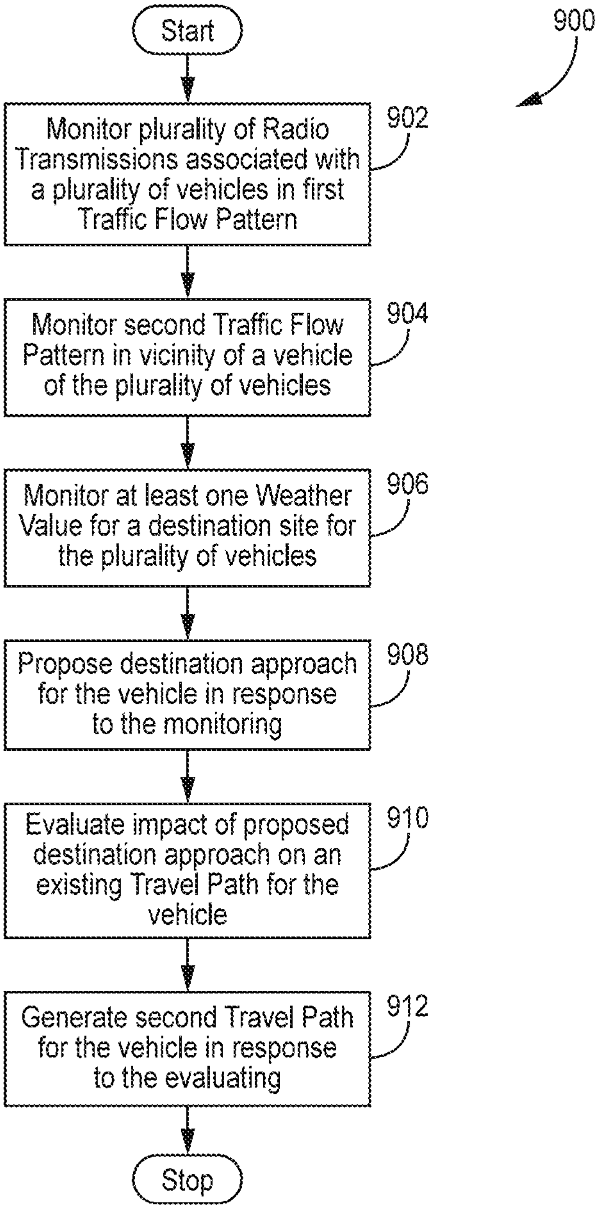
FIG. 9 illustrates a fourth method that can be utilized to implement one example embodiment of the present invention.

FIG. 9 illustrates a fourth method 900, which can be utilized to implement one example embodiment of the present invention. For example, the method 900 can be utilized to implement exemplary functions of the components of the traffic analytics system 202 illustrated in FIG. 2 and thus the predictor engine 502 illustrated in FIG. 5. As such, referring to FIGS. 2, 5 and 9 for this example embodiment, the method 900 begins by the traffic analytics system 202 (e.g., traffic pattern detector 524) monitoring the ADS-B position transmissions for a plurality of vehicles (e.g., aircraft 208, 210, 212, 215, 216, etc.) in a traffic flow pattern (902). The traffic analytics system 202 (e.g., traffic pattern detector 524) also monitors the traffic flow pattern in the vicinity of a vehicle (e.g., ownship 208) of the plurality of vehicles (904). Additionally, the traffic analytics system 202 further monitors weather information (e.g., wind direction and velocity, snow, sleet rain, etc. from a weather information system 508) for a destination site (e.g., airport, runway) for the vehicles involved (906). In response to receiving the monitored information, the traffic analytics system 202 (e.g., traffic route generator 526) computes a proposed approach (e.g., course) to the destination site for the vehicle (e.g., ownship 208) involved (908). The traffic analytics system 202 (e.g., traffic route generator 526) then computes an evaluation of the impact of the proposed approach on an existing travel path (e.g., course) for the vehicle involved (910). In response to the evaluation, the traffic analytics system 202 (e.g., traffic route generator 526) then computes and generates a second travel path (e.g., different course) for the vehicle involved (912). The method 900 is then terminated.

EXAMPLE EMBODIMENTS

Example 1 includes a method, comprising: receiving travel path information for each vehicle of a plurality of vehicles in transit; receiving traffic pattern information for the plurality of vehicles in transit; receiving weather information for a prospective destination of the plurality of vehicles in transit; computing a travel path to the prospective destination based on at least one of the received travel path information, the received traffic pattern information, and the received weather information; determining if the computed travel path is substantially different than a predetermined travel path to the prospective destination; and if the computed travel path is different than the predetermined travel path to the prospective destination, revising a travel plan to the prospective destination for a vehicle receiving the travel path information, the traffic pattern information, and the weather information.

Example 2 includes the method of Example 1, wherein the receiving travel path information for each vehicle of a plurality of vehicles in transit comprises receiving flight path information for each aircraft of a plurality of aircraft in flight.

Example 3 includes the method of any of Examples 1-2, wherein the computing comprises computing the travel path based on the received traffic pattern information indicating that at least one vehicle of the plurality of vehicles is diverting substantially away from the predetermined travel path.

Example 4 includes the method of any of Examples 1-3, wherein the computing comprises computing the travel path based on the received weather information indicating a substantial change in a direction of a prevailing wind at the prospective destination.

Example 5 includes the method of any of Examples 1-4, wherein the computing comprises computing the travel path based on the received weather information indicating a substantial change in a magnitude of a prevailing wind at the prospective destination.

Example 6 includes the method of any of Examples 1-5, wherein the revising the travel plan to the prospective destination comprises determining a waypoint associated with a potential diversion from the predetermined travel path.

Example 7 includes the method of any of Examples 1-6, wherein the revising the travel plan to the prospective destination for the vehicle receiving the travel path information comprises revising the travel plan in response to a transmission from an operations center associated with a second vehicle of the plurality of vehicles.

Example 8 includes the method of any of Examples 1-7, wherein the revising the travel plan to the prospective destination for the vehicle receiving the travel path information comprises revising a current travel plan and generating a proposed travel plan.

Example 9 includes the method of any of Examples 1-8, further comprising generating a plurality of lateral and vertical flight trajectories for the vehicle if the computed travel path is different than the predetermined travel path to the prospective destination.

Example 10 includes the method of any of Examples 1-9, wherein the revising the travel plan to the prospective destination for the vehicle receiving the travel path information comprises generating a proposed flight plan and storing the proposed flight plan in a flight management system for the vehicle.

Example 11 includes a system, comprising; a radio transcription decoder configured to receive at least one transmission from an operations center; a traffic pattern detector coupled to at least the radio transcription decoder and configured to generate a route pattern for each vehicle of a plurality of vehicles in transit; a traffic route generator coupled to at least the traffic pattern detector and configured to create a record of historical and tactical travel path route change information for at least one vehicle of the plurality of vehicles; a navigation database coupled to at least the traffic pattern detector and configured to store current navigation data including at least current waypoint information, destination information and arrival procedure information associated with the destination information; and a modified route generator coupled to at least the navigation database and configured to retrieve changed navigation data from the navigation database, wherein the system is enabled to determine if a vehicle of the plurality of vehicles is diverting or preparing to divert substantially away from the route pattern in response to receiving the at least one transmission or a change or prospective change to a route pattern for a second vehicle of the plurality of vehicles in transit.

Example 12 includes the system of Example 11, wherein the system comprises a flight plan change predictor engine.

Example 13 includes the system of Example 12, further comprising an electronic flight bag (EFB) onboard the at least one aircraft and coupled to the flight plan change predictor engine for data communications therebetween.

Example 14 includes the system of Example 13, further comprising a flight management system (FMS) onboard the at least one aircraft and coupled to the EFB for data communications therebetween.

Example 15 includes a method for enhancing operator situational awareness, comprising: monitoring a plurality of radio transmissions associated with a plurality of vehicles in a first traffic flow pattern; monitoring a second traffic flow pattern in a vicinity of a vehicle of the plurality of vehicles; monitoring at least one weather value for a destination site for the plurality of vehicles; proposing a destination approach for the vehicle in response to the monitoring; evaluating an impact of the proposed destination approach on an existing travel path for the vehicle; and generating a second travel path for the vehicle in response to the evaluating.

Example 16 includes the method of Example 15, wherein the generating the second travel path further comprises generating a direct-to waypoint for the vehicle to divert from the existing travel path.

Example 17 includes the method of any of Examples 15-16, wherein the generating the second travel path further comprises updating at least one of a wind direction value and wind magnitude value with current wind direction or magnitude information.

Example 18 includes the method of any of Examples 15-17, wherein the generating the second travel path further comprises generating lateral flight trajectory data and vertical flight trajectory data for the second travel path.

Example 19 includes the method of any of Examples 15-18, wherein the generating the second travel path further comprises generating a visual depiction of the second travel path.

Example 20 includes the method of any of Examples 15-19, further comprising storing the second travel path in a flight management system of the vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:

determining whether a current route pattern of a vehicle ahead of a subject vehicle has changed from a predetermined route pattern to a destination;

in response to determining that the current route pattern of the vehicle ahead of the subject vehicle has changed from the predetermined route pattern, predicting a change to a current route pattern for the subject vehicle will occur;

generating a new route pattern including the predicted change for the subject vehicle;

receiving a confirmation that the generated new route pattern including the predicted change for the subject vehicle is accepted; and in response to receiving the confirmation, uploading the generated new route pattern including the predicted change for the subject vehicle into a system of the subject vehicle.

2. The computer-implemented method of claim 1, further comprising:

displaying the generated new route pattern including the predicted change for the subject vehicle; and receiving a verification that the predicted change to the current route pattern for the subject vehicle has occurred.

3. The computer-implemented method of claim 2, wherein the displaying the generated new route pattern including the predicted change for the subject vehicle includes displaying a visual display of the displaying the generated new route pattern including the predicted change for the subject vehicle and an impact of the predicted change on the current route pattern for the subject vehicle.

4. The computer-implemented method of claim 2, wherein the receiving the confirmation is performed in response to receiving the verification that the predicted change to the current route pattern for the subject vehicle has occurred.

5. The computer-implemented method of claim 1, wherein the determining whether the current route pattern of the vehicle ahead of the subject vehicle has changed from the predetermined route pattern to the destination further comprises:

receiving information from sources external to the subject vehicle;

based on the received information, determining whether a change request has been made for the current route pattern of the vehicle ahead of the subject vehicle; and in response to determining that the change request has been made for the current route pattern of the vehicle ahead of the subject vehicle, performing the determining whether the current route pattern of the vehicle ahead of the subject vehicle has changed from the predetermined route pattern to the destination.

6. The computer-implemented method of claim 5, wherein the received information includes one or more of a broadcast from a traffic controller, meteorological information, or a broadcast from the vehicle ahead of the subject vehicle.

7. The computer-implemented method of claim 1, wherein the generating the new route pattern including the predicted change for the subject vehicle further comprises:

determining the current route pattern of the vehicle ahead of the subject vehicle;

determining a divergence of the determined current route pattern of the vehicle ahead of the subject vehicle from the predetermined route pattern; and based on the determined divergence and the current route pattern for the subject vehicle, generating the new route pattern including the predicted change for the subject vehicle.

8. The computer-implemented method of claim 1, wherein the vehicle ahead of the subject vehicle is a lead vehicle among a plurality of vehicles ahead of the subject vehicle following the predetermined route pattern to the destination.

9. The computer-implemented method of claim 1, wherein the determining whether the current route pattern of the vehicle ahead of the subject vehicle has changed from the predetermined route pattern to the destination further comprises determining whether the current route pattern of the vehicle ahead of the subject vehicle is substantially different from the predetermined route pattern to the destination.

10. The computer-implemented method of claim 1, wherein the new route pattern including the predicted change for the subject vehicle includes changes to lateral and vertical trajectories for the subject vehicle.

11. A system comprising:

at least one memory to store instructions; and at least one processor to execute the stored instructions to perform a method, the method including:

determining whether a current route pattern of a vehicle ahead of a subject vehicle has changed from a predetermined route pattern to a destination;

in response to determining that the current route pattern of the vehicle ahead of the subject vehicle has changed from the predetermined route pattern, predicting a change to a current route pattern for the subject vehicle will occur;

generating a new route pattern including the predicted change for the subject vehicle;

receiving a confirmation that the generated new route pattern including the predicted change for the subject vehicle is accepted; and in response to receiving the confirmation, uploading the generated new route pattern including the predicted change for the subject vehicle into a system of the subject vehicle.

12. The system of claim 11, wherein the method further comprises:

displaying the generated new route pattern including the predicted change for the subject vehicle; and receiving a verification that the predicted change to the current route pattern for the subject vehicle has occurred.

13. The system of claim 12, wherein the displaying the generated new route pattern including the predicted change for the subject vehicle includes displaying a visual display of the displaying the generated new route pattern including the predicted change for the subject vehicle and an impact of the predicted change on the current route pattern for the subject vehicle.

14. The system of claim 12, wherein the receiving the confirmation is performed in response to receiving the verification that the predicted change to the current route pattern for the subject vehicle has occurred.

15. The system of claim 11, wherein the determining whether the current route pattern of the vehicle ahead of the subject vehicle has changed from the predetermined route pattern to the destination further comprises:

receiving information from sources external to the subject vehicle;

based on the received information, determining whether a change request has been made for the current route pattern of the vehicle ahead of the subject vehicle; and in response to determining that the change request has been made for the current route pattern of the vehicle ahead of the subject vehicle, performing the determining whether the current route pattern of the vehicle ahead of the subject vehicle has changed from the predetermined route pattern to the destination.

16. The system of claim 15, wherein the received information includes one or more of a broadcast from a traffic controller, meteorological information, or a broadcast from the vehicle ahead of the subject vehicle.

17. The system of claim 11, wherein the generating the new route pattern including the predicted change for the subject vehicle further comprises:

determining the current route pattern of the vehicle ahead of the subject vehicle;

determining a divergence of the determined current route pattern of the vehicle ahead of the subject vehicle from the predetermined route pattern; and based on the determined divergence and the current route pattern for the subject vehicle, generating the new route pattern including the predicted change for the subject vehicle.

18. The system of claim 11, wherein the vehicle ahead of the subject vehicle is a lead vehicle among a plurality of vehicles ahead of the subject vehicle following the predetermined route pattern to the destination.

19. The system of claim 11, wherein the determining whether the current route pattern of the vehicle ahead of the subject vehicle has changed from the predetermined route pattern to the destination further comprises determining whether the current route pattern of the vehicle ahead of the subject vehicle is substantially different from the predetermined route pattern to the destination.

20. A non-transitory computer-readable medium storing instructions that, when executed by one or more processors, cause the one or more processors to perform a method, the method comprising:

determining whether a current route pattern of a vehicle ahead of a subject vehicle has changed from a predetermined route pattern to a destination;

in response to determining that the current route pattern of the vehicle ahead of the subject vehicle has changed from the predetermined route pattern, predicting a change to a current route pattern for the subject vehicle will occur;

generating a new route pattern including the predicted change for the subject vehicle;

receiving a confirmation that the generated new route pattern including the predicted change for the subject vehicle is accepted; and in response to receiving the confirmation, uploading the generated new route pattern including the predicted change for the subject vehicle into a system of the subject vehicle.

* * * * *